US011619539B2

(12) United States Patent
Fjellstad et al.

(10) Patent No.: US 11,619,539 B2
(45) Date of Patent: Apr. 4, 2023

(54) INADVERTENT SUBSEQUENT SCAN PREVENTION FOR SYMBOLOGY READER WITH WEIGHING PLATTER

(71) Applicant: ZEBRA TECHNOLOGIES CORPORATION, Lincolnshire, IL (US)

(72) Inventors: Christopher J. Fjellstad, Smithtown, NY (US); William Doering, Cupertino, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 320 days.

(21) Appl. No.: 16/945,536

(22) Filed: Jul. 31, 2020

(65) Prior Publication Data

US 2022/0034706 A1 Feb. 3, 2022

(51) Int. Cl.
*G01G 19/52* (2006.01)
*G01G 21/28* (2006.01)
*G06K 7/14* (2006.01)

(52) U.S. Cl.
CPC .......... *G01G 19/52* (2013.01); *G01G 21/283* (2013.01); *G06K 7/1413* (2013.01); *G06K 7/1443* (2013.01)

(58) Field of Classification Search
CPC .. G01G 19/4144; G01G 19/52; G01G 21/283; G06K 7/1413; G06K 7/1443
See application file for complete search history.

(56) References Cited

U.S. PATENT DOCUMENTS

| 5,967,264 A | 10/1999 | Lutz et al. |
| 6,215,078 B1 * | 4/2001 | Torres ................ G01G 19/4144 235/383 |
| 6,860,427 B1 | 3/2005 | Schmidt et al. |
| 9,685,049 B2 * | 6/2017 | Au ....................... G06K 7/1413 |
| 2003/0121974 A1 * | 7/2003 | Blanford ............. G07G 1/0054 235/383 |
| 2005/0278264 A1 | 12/2005 | Jacobson et al. |
| 2010/0139989 A1 * | 6/2010 | Atwater ............ G01G 23/3735 382/199 |
| 2013/0001290 A1 | 1/2013 | Trajkovic et al. |
| 2015/0090503 A1 | 4/2015 | McQueen et al. |

(Continued)

OTHER PUBLICATIONS

International Search Report and Written Opinion for International Application No. PCT/US2021/038184 dated Sep. 29, 2021.

(Continued)

*Primary Examiner* — Randy W Gibson
(74) *Attorney, Agent, or Firm* — Yuri Astvatsaturov

(57) ABSTRACT

Methods of detecting scan avoidance events during decode sessions are disclosed herein. An example method includes during a timeout period at one or more processors of the symbology scanner, identifying and decoding a transaction affecting indicia on an object in one or more images to obtain a transaction affecting payload; during the timeout period at the one or more processors, identifying one or more visual features in the one or more images; and in response to identifying a non-transaction affecting indicia associated with the one or more visual features, and failing to identify or decode the transaction affecting indicia, determining a potential scan avoidance attempt and generating a scan avoidance alarm signal.

24 Claims, 6 Drawing Sheets

(56) References Cited

U.S. PATENT DOCUMENTS

| | | | | |
|---|---|---|---|---|
| 2016/0109281 A1* | 4/2016 | Herring | ............... | G06T 7/66 |
| | | | | 177/1 |
| 2016/0189489 A1* | 6/2016 | Au | ............... | G07G 1/0072 |
| | | | | 235/383 |

OTHER PUBLICATIONS

GS1. "GS1 DataMatrix Guideline." The Global Language of Business, Jan. 2018 (Jan. 2018) retrieved on Aug. 23, 2021 (Aug. 23, 2021) from <https://www.gs1.org/docs/barcodes/GS1_DataMatrix_Guideline/pdf> entire document.

* cited by examiner

INADVERTENT SUBSEQUENT SCAN PREVENTION FOR SYMBOLOGY READER WITH WEIGHING PLATTER

BACKGROUND

Increasingly in retail environments, customers and cashiers desire to scan produce for purchase at a scanning station which may be part of a point-of-sale system. Commonly, the customer or cashier identifies the produce item using a digital display, such as a touchscreen, or by scanning or entering an item code printed on a label attached to the produce, such as a GS1 Databar label. Produce is typically priced by weight, and, as such, after identifying the produce to the point-of-sale system, the customer or cashier will typically place the produce on a weighing platter that weighs the produce communicates the weighing information to the point-of-sale station which determines a price for the produce. This constitutes the desired scanning of the produce. Unfortunately, after being weighed by the weighing platform, the produce can be inadvertently scanned a second time when it is removed from the weighing platter. With the advent of more advance, more powerful scanning stations, when produce is removed from the weighing platter, an imaging assembly within the scanning station may inadvertently scan the GS1 Databar and decode the scan, thereby showing the already-scanning produce as ready for purchasing second time. This inadvertent scan requires the cashier or customer to perform a cancellation before they can properly scan the next actual item they desired for purchase. This inadvertent scan problem is time consuming for cashiers and frustrating for customers. A technique for avoiding inadvertent second scan of an item removed from a weighing platter is desired.

SUMMARY

In an embodiment, a computer-implemented method for preventing inadvertent subsequent scanning using a symbology reader, includes: scanning and decoding a barcode on an object using the symbology scanner; detecting presence of the object at a weighing platter of the symbology reader and detecting stabilization of the object at the weighing platter; and responsive to detecting the stabilization of the object, preventing reporting of subsequent decoding of the barcode until a release condition is satisfied.

In variations of the embodiment, the method further includes monitoring for the release condition starting from the detection of the stabilization of the object. In some examples, the release condition is a timeout period measured from the detection of the stabilization of the object.

In variations of the embodiment, the method further includes: detecting an destabilization of the object; and monitoring for the release condition from the detection of the destabilization of the object. In some examples, the release condition is a timeout period measured from the detection of the destabilization of the object. In some examples, the destabilization is movement of the object determined by an imaging assembly of the symbology reader platter. In some examples, the release condition is movement of the object out of a field of view of an imaging assembly of the symbology reader.

In variations of the embodiment, the stabilization of the object is placement of the object on the weighing platter, and the method further includes: detecting at least a partial removal of the object from the weighing platter, wherein the release condition is a timeout period measured from the removal of the object from the weighing platter. In some examples, detecting at least the partial removal of the object from the weighing platter includes detecting when the weighing platter detects a zero weight value. In some examples, detecting at least the partial removal of the object from the weighing portion includes analyzing one or more images of the object captured by an imaging assembly of the symbology reader and determining from the one or more images when the object is off of the weighing platter. In some examples, the method further includes detecting the stabilization of the object by detecting a scale signal of the weighing platter and determining that the scale signal does not vary within a stabilization time period.

In variations of the embodiment, the release condition is a timeout period, and the method further includes if the object is no longer detected within a field of view of the weighing platter during the timeout period, ending the timeout period and allowing a reporting of a subsequently decode barcode.

In variations of the embodiment, the barcode is associated with a weight data element. In some examples, the barcode is a GS1 code.

In another embodiment, a symbology reader to prevent inadvertent subsequent scanning, includes: a housing having a weighing platter; an imaging assembly within the housing and configured to capture one or more images over at least one field of view; a processor within the housing; and a tangible machine-readable storage medium within the housing and storing machine-readable instructions that, when executed by the processor, cause the processor to: scan and decode a barcode on an object; detect a presence of the object on the weighing platter and detect stabilization of the object on the weighing platter; and responsive to detecting the stabilization of the object, prevent reporting of subsequent decoding of the barcode until a release condition is satisfied.

In variations of the embodiment, the tangible machine-readable storage medium stores machine-readable instructions that cause the processor to: monitor for the release condition starting from the detection of the stabilization of the object.

In variations of the embodiment, the release condition is a timeout period measured from the detection of the stabilization of the object.

In variations of the embodiment, tangible machine-readable storage medium stores machine-readable instructions that cause the processor to: detect an destabilization of the object; and monitor for the release condition from the detection of the destabilization of the object. In some examples, the release condition is a timeout period measured from the detection of the destabilization of the object. In some examples, the release condition is movement of the object determined by the imaging assembly. In some examples, the release condition is movement of the object out of a field of view of the imaging assembly.

In variations of the embodiment, the stabilization of the object is placement of the object on the weighing platter, and the tangible machine-readable storage medium stores machine-readable instructions that cause the processor to: detect at least a partial removal of the object from the weighing platter, wherein the release condition is a timeout period measured from the removal of the object from the weighing platter. In some examples, the tangible machine-readable storage medium stores machine-readable instructions that cause the processor to detect at least the partial removal of the object from the weighing portion by detecting when the weighing platter detects a zero weight value.

In some examples, the tangible machine-readable storage medium stores machine-readable instructions that cause the processor to detect at least the partial removal of the object from the weighing portion by analyzing one or more images of the object captured by the imaging assembly and determining from the one or more images when the object is off of the weighing platter.

In variations of the embodiment, the tangible machine-readable storage medium stores machine-readable instructions that cause the processor to detect the stabilization of the object by detecting a scale signal of the weighing platter and determining that the scale signal does not vary within a stabilization time period.

In variations of the embodiment, the release condition is a timeout period, and the tangible machine-readable storage medium stores machine-readable instructions that cause the processor to: if the object is no longer detected within a field of view of the weighing platter during the timeout period, end the timeout period and allow a reporting of a subsequently decode barcode.

In variations of the embodiment, the symbology reader is a bioptic scanner having a tower power and a horizontal portion comprising the weighing platter. In some examples, the imaging assembly comprises an imager in at least one of the tower power or the horizontal portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
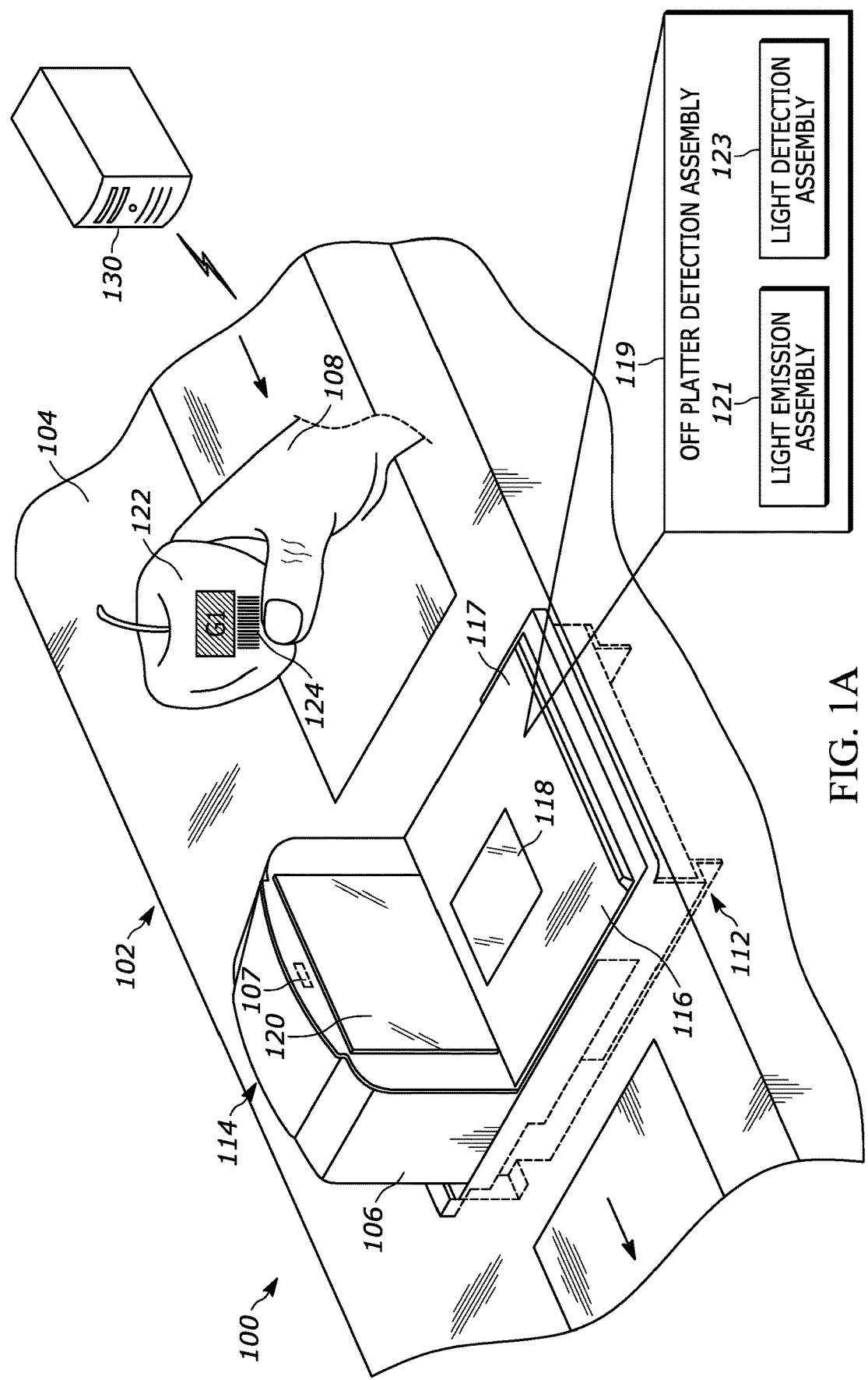
FIG. 1A illustrates a perspective view of an example POS system with symbology reader, in accordance with aspects of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

As a retail employee or customer scans an item for purchase, the scanning station of point-of-sale system in coordination with the scanning station enters a timeout period, e.g., approximately 0.5 s, during which the subsequent rescanning of the item is prevented. Once the timeout period ends, the employee or customer can scan the item. With advances in scanning stations, a problem of inadvertent rescanning of the already-scanned item has arisen, in particular with items such as produce that not only require scanning or entry of an identifier code, but which also require weighing of the item to determine the purchase price. The time it takes for a retail employee or customer to place an item on a scan and weigh it can be greater than the conventional timeout period, which can result in a scanning station with more advanced scanning capability inadvertently rescanning the item, e.g., rescanning and decoding its barcode, before the user is ready to scan an actual next item. Such situations often result in inconvenience, frustration, delay, etc. for a customer and for an employee. Accordingly, aspects of this disclosure can be used to prevent inadvertent subsequent scanning of an item using a symbology reader that can detect the presence of an item and when that item has stabilized to prevent rescanning or reporting of a rescanning of an item or barcode thereof until a release condition is satisfied. Advantageously, the examples disclosed herein may achieve such benefits within the symbology reader, i.e., scanning station, without requiring time consuming data communication and coordination with a point-of-sale (POS) system or server.

Techniques herein may be implemented on any type of symbology reader, such as for example a bi-optical symbology reader or other scanning station having a weighing platter, integrated therein or communicatively coupled thereto through a wired or wireless connection. Moreover, the techniques herein may be used to prevent inadvertent scanning of any item to be scanned on a scanning station, such as at a point-of-sale location in a retail environment. Further, while the following disclosure refers to example symbology readers and POS systems, aspects of this disclosure may be used with any number and/or type(s) of symbology readers including bi-optical readers, stationary barcode readers, handheld barcode readers, presentation mode barcode readers, etc. Moreover, while example symbology readers are disclosed in conjunction with POS systems, aspects of this disclosure to detect scan avoidance events can be used in conjunction with storage systems, inventory systems, etc. In examples detailed herein, the symbology reader is also referred to as a barcode reader.

The techniques herein may be used to prevent inadvertent scanning of any item bearing a barcode, such as a universal product code (UPC), a European article number (EAN), QR, etc. The techniques herein may be used to prevent inadvertent scanning of any item, such as fresh produce, that bears a GS1 Databar barcode or any barcode having payloads that can contain information such as the produce item's type, batch number or expiry data, and/or item weight. The techniques herein may be used to prevent inadvertent scanning of any item identifiable bearing an indicia that may be decode, including, in additional to barcodes, texts, graphics, labels, or other indicia.

Figure 3:
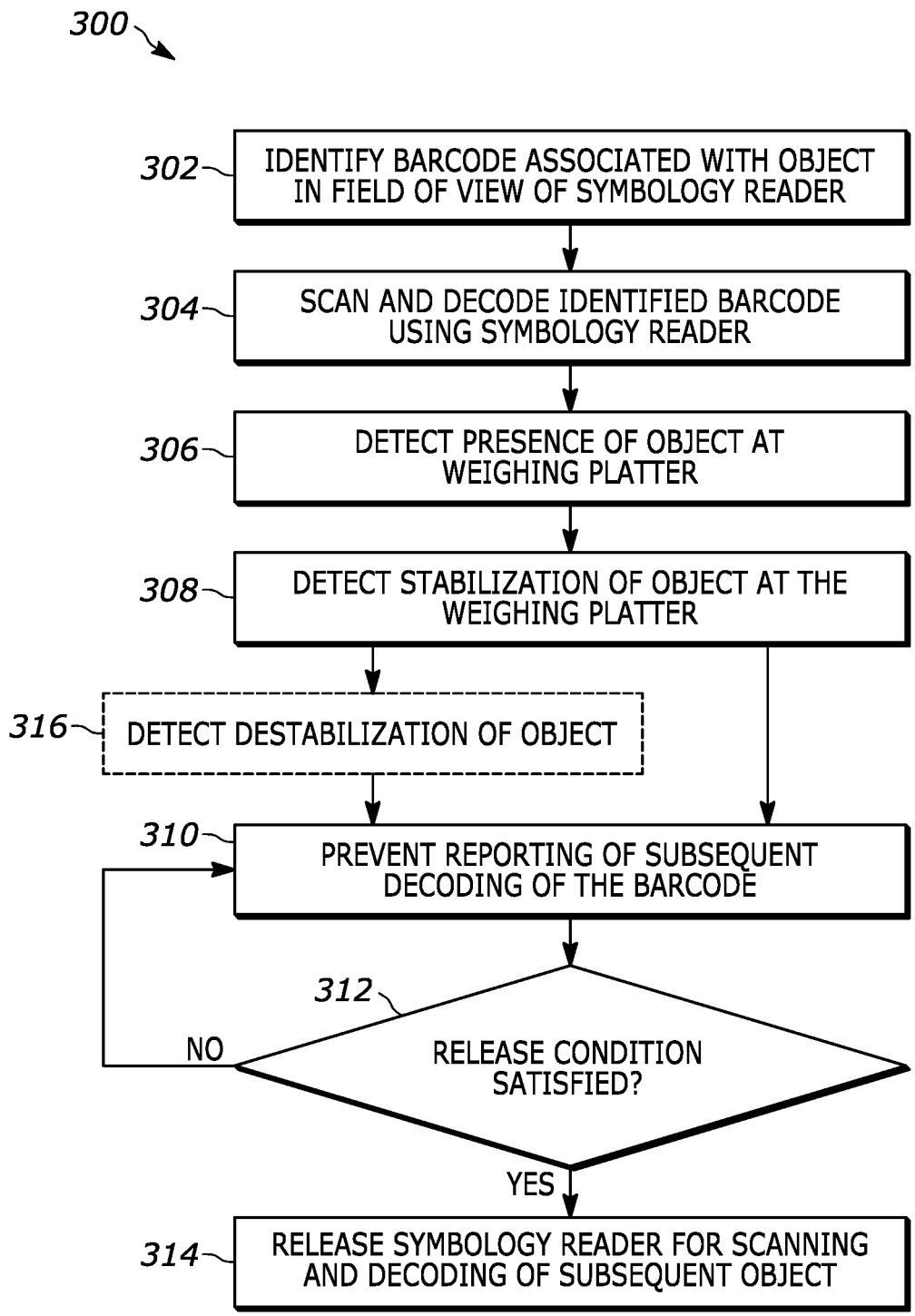
FIG. 3 is a flowchart representative of example methods, logic or machine-readable instructions for implementing the example scan avoidance event detector of FIGS. 1A, 1B, 1C, and 2, in accordance with aspects of this disclosure.

FIG. 1 illustrates a perspective view of an example POS system 100 having a workstation 102 with a counter 104 and a symbology reader 106 (in this example a bi-optic barcode reader) that may be used to implement the example systems and methods disclosed herein to prevent inadvertent subsequent scanning during a timeout period, including the methods illustrated in FIG. 3. The POS system 100 is often managed, operated, etc. by a store employee such as a clerk 108. However, in other cases the POS system 100 may be a part of a so-called self-checkout lane where instead of a clerk, a customer is responsible for checking out his or her own products.

The barcode reader 106 includes a first (e.g., lower) housing 112 and a second (e.g., raised, vertical or tower) housing 114. The lower housing 112 includes a top portion 116 with a first optically transmissive window 118 positioned therein along a generally horizontal plane relative to the overall configuration and placement of the barcode reader 106. Generally speaking, the top portion 116 includes a removable or a non-removable weighing platter 117 (e.g., an electronic scale configured to measure/register the weight of objects placed on the top portion 116). The top portion 116 is positioned substantially parallel with a top surface of the counter 104. As set forth herein, the phrase "substantially parallel" means+/−30° of parallel and/or accounts for manufacturing tolerances. While in FIG. 1, the counter 104 and the top portion 116 are illustrated as being about co-planar, the top portion 116 and the counter 104 may, additionally and/or alternatively, be considered as being about parallel. In some examples, the surface of the counter 104 is raised or lowered relative to the top portion 116, while the top portion 116 remains substantially parallel with the top surface of the counter 104.

In some examples, the weighing platter 117 is part of a weigh platter assembly that will generally include the weighing platter 117 and an scale configured to measure the weight of an object placed on an example surface of the top portion 116, or some portion thereof. The weighing platter 117 may be part of an off-platter detection assembly 119 that includes an example light emission assembly 121 and an example light detection assembly 123. In an example, a light source (not shown for clarity of illustration) of the light emission assembly 121 is controlled to emit one or more pulses of light, and a light sensor (not shown for clarity of illustration) of the light detection assembly 123 captures light and the off-platter detection assembly 119 can process light detection information to detect when a portion of an item, object, etc. is not resting on or is partially extending over an edge of the weighing platter 117 as an off-platter weigh condition. For simplicity, only a single light emission assembly 121 and only a single light detection assembly 123 are described herein, however, it will be understood that off-platter detection assembly 119 can also include any number and/or type(s) of light emission assemblies, and any number and/or type(s) light detection assemblies may be implemented to detect off-platter weigh condition.

The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 30°.

In practice, a product, object, item 122, etc., such as for example fresh produce, is scanned by the barcode reader 106 such that a transaction affecting indicia (e.g., a barcode 124) associated with the item 122 is read (e.g., imaged and decoded) through at least one of the first optically transmissive window 118 and the second optically transmissive window 120. This is particularly done by positioning the item 122 within fields of view (FOV) of digital imaging sensor(s) (e.g., a camera 107) housed inside the barcode reader 106 behind the windows 120 and/or 118. In various examples, each of the windows 120 and 118 may be associated with a different FOV, i.e., the raised housing 114 may have a vertically-extending FOV and the lower housing 112 may a horizontally-extending FOV. Additionally, as the item 122 is positioned within one of the FOVs the barcode reader 106, the cameras obtain image data of the item 122. In some examples, the image data is to verify that the item 122 scanned matches the barcode 124.

In the illustrated example, the barcode 124 is a GS1 Databar, commonly used on produce items, although the barcode 124 may represent any type of barcode or symbology scannable and decodable by the barcode reader 106.

In the illustrated example of FIG. 1, the imaging system 100 includes a remote server 130 communicatively coupled to the barcode reader 106 through a wired or wireless communication link. In some examples, the remote server 130 is communicatively coupled to a plurality of imaging systems 100 positioned at checkout area of a facility, for example. In some examples, the remote server 130 is implemented as a POS system server or inventory management server that generates and compares object identification data. In some examples, the remote server 130 is accessible by a manager for monitoring operation and improper product scanning by the imaging system 100.

Figure 1B:
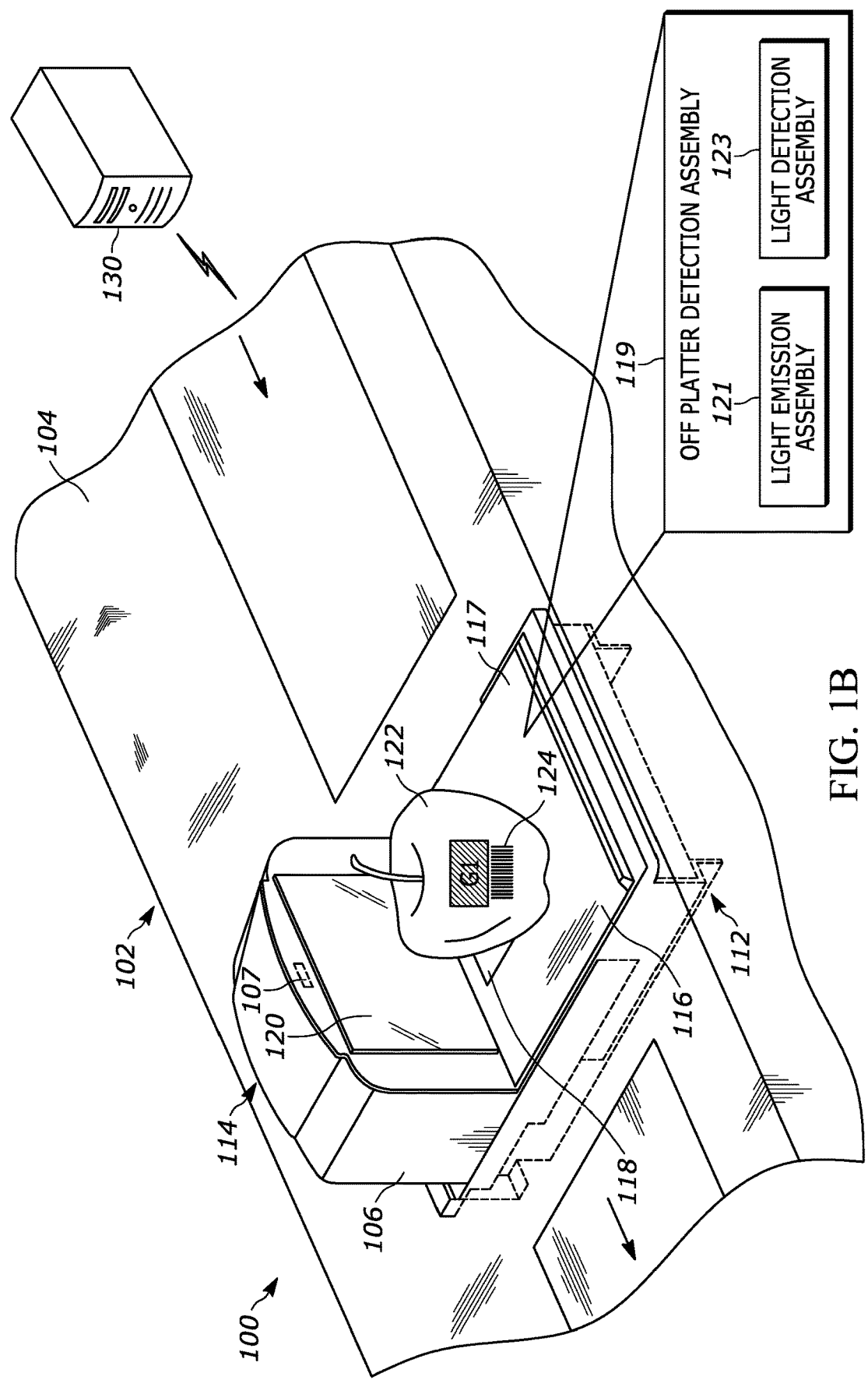
FIG. 1B illustrates the example POS system with symbology reader showing an object in a stationary position on weighing platter, in accordance with an example.
Figure 1C:
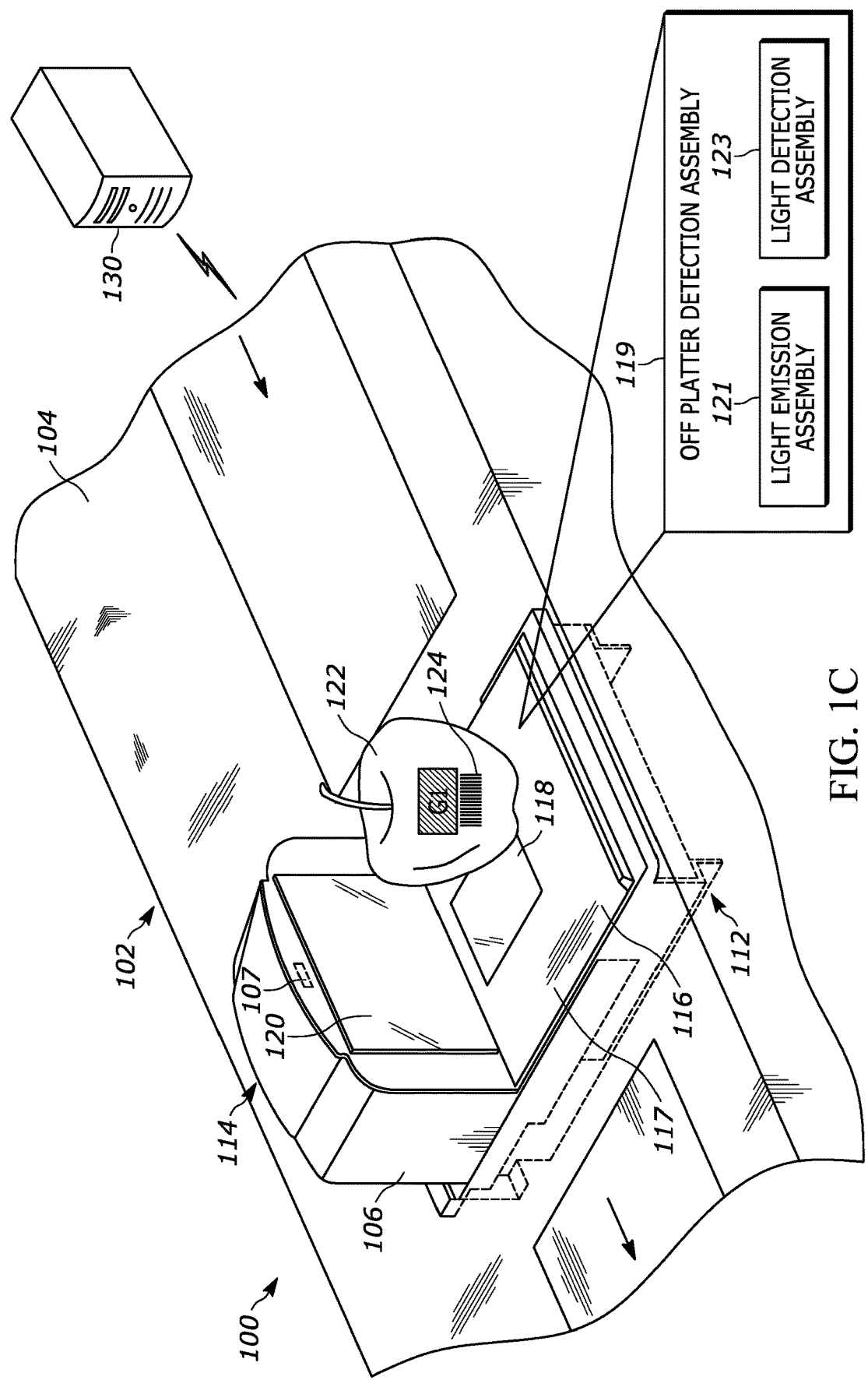
FIG. 1C illustrates the example POS system with symbology reader with the object removed from the weighing platter, in accordance with an example.

In examples herein, techniques include preventing inadvertent subsequent scanning by the barcode reader 106 by scanning and decoding the barcode 124 and detecting the presence of the item 122 on the weighing platter 117 and detecting the stabilization of the object on that weighing platter 117. FIG. 1B illustrates the produce item 122 on the weighing platter 117 and in a stable position, i.e., where the item 122 is detected as stationary and not moving. FIG. 1C illustrates the produce item 122 after it has been removed from the weighing platter 117 (user hand not shown), but it is still visible within a FOV of one or both of the windows 120 and 118.

Figure 2:
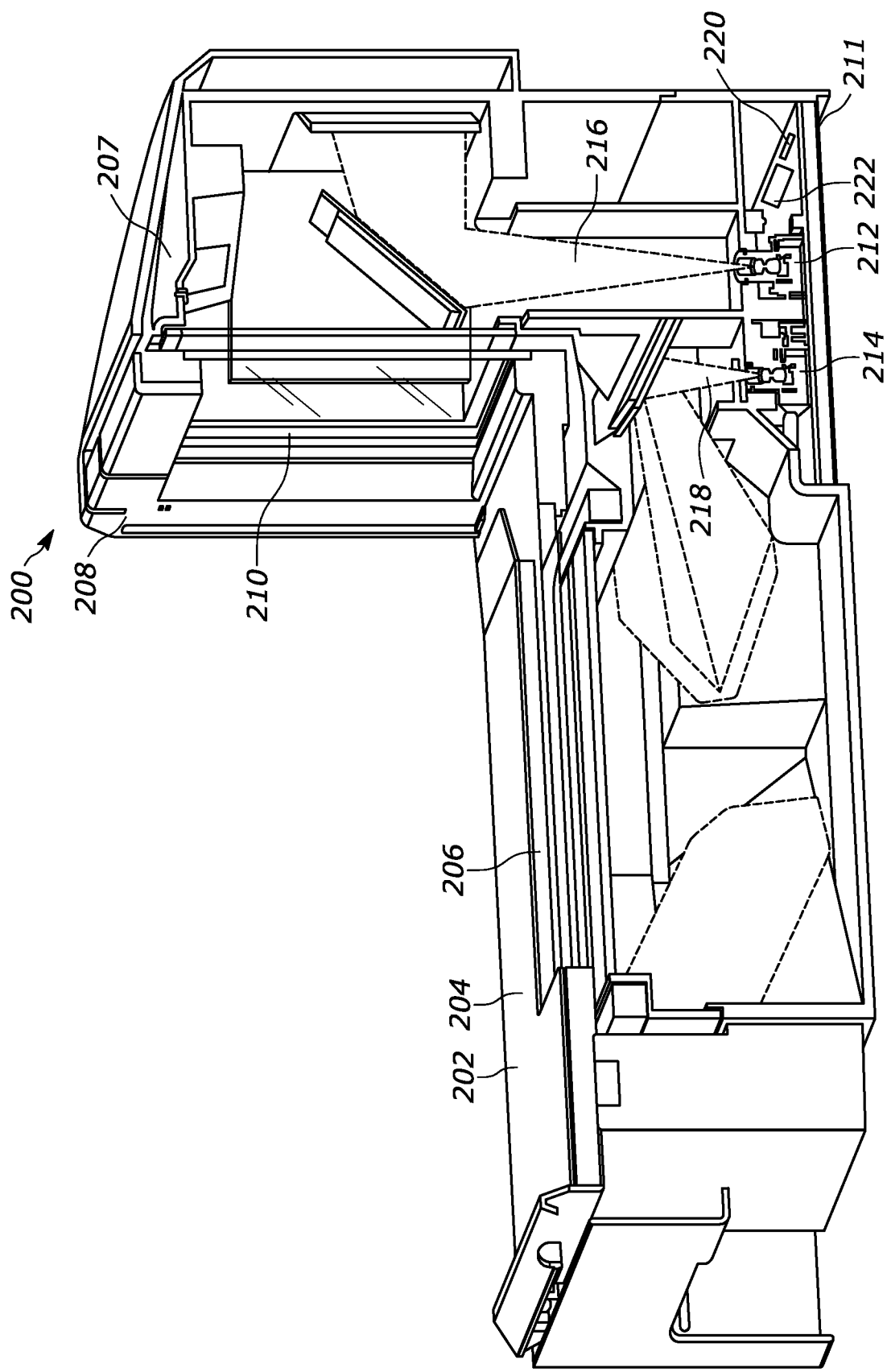
FIG. 2 illustrates a cross-sectional perspective view of an example bi-optic barcode reader including a scan avoidance event detector, in accordance with aspects of this disclosure.

FIG. 2 illustrates a cross-sectional perspective view of an example bi-optic barcode reader 200 that can be used to implement the barcode reader 106 of FIG. 1, in accordance with embodiments of this disclosure. As shown, the barcode reader 200 includes an example first (e.g., lower or platter) housing portion 202 that supports a generally horizontal weighing platter 204 having a first, generally horizontal window 206. The barcode reader 200 is also shown including an example second (e.g., raised, vertical or tower) housing portion 208 that supports a second, generally vertical optically transmissive window 210. As shown, the first window 206 is substantially perpendicular relative to the second window 210. As set forth herein, the phrase "substantially perpendicular" means+/−30° of perpendicular and/or accounts for manufacturing tolerances.

To enable imaging data to be obtained by the barcode reader 200, the barcode reader 200 includes a printed circuit board (PCB) 211 with one or more imaging assemblies 212, 214 (e.g., cameras). Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 is configured to capture image data over a first FOV 216 (shown internally before extending out of the window 210) and the second imaging assembly 214 is configured to capture image data over a second FOV 218 (shown internally before extending out of window 206). The image data captured by the first and second imaging assemblies 212, 214 may include image data representative of an environment in which a barcode or target may appear. In some examples, the logic circuit 400 of FIG. 4 implements the PCB 211. In various examples, the example processes described in reference to PCB 211 and/or, more generally aspects of the PCB 211 may be achieved in hardware, in software, firmware, and/or some combination thereof.

To identify and decode indicia from images of items, the PCB 211 includes any number and/or type(s) of barcode decoder 220. To prevent inadvertent subsequent scanning, the PCB 211 includes an example scan event detector 222. The scan event detector 222 communicates with the weighing platter 204 and optionally the imaging assemblies 212 and 214 to detect the presence of an item on weighing platter 204, stabilization of that item on the weighing platter 204, and destabilization of the item from the weighing platter 204. The scan event detector 222 may also determine if a release condition is satisfied and determine when to initiate a timeout period during which subsequent scanning of the item is prevented. In some examples, when a release condition is awaiting satisfaction, the scan event detector 222 may generate a signal or notification, such as a visual indication at the barcode reader 200. In some examples, the scan event detector 222 may generate a signal or notification upon satisfaction of the release condition. In some examples, the scan event detector 222 may communicate the satisfaction of the release condition to a POS system server or other remote computing device.

Figure 4:
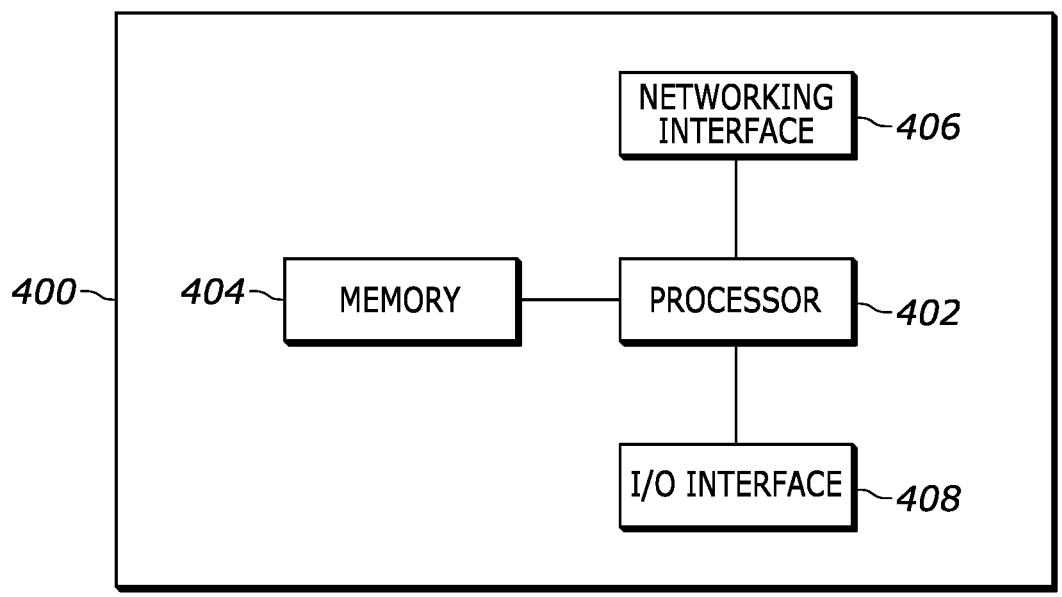
FIG. 4 is a block diagram of an example logic circuit to implement the example methods, apparatus, logic, and/or operations described herein.

In some examples, the barcode decoder 220 and the scan event detector 222 are implemented as one or more modules of machine-readable instructions executing on a processor or logic device, such as the processor 502 of the logic circuit 400 of FIG. 4. Additionally and/or alternatively, the barcode decoder 220 and/or the scan event detector 222 may be implemented by hardware, software, firmware, and/or some combination thereof.

A flowchart 300 representative of example processes, methods, logic, software, computer- or machine-readable instructions for implementing by the barcode reader 106 and/or the barcode reader 200 and the scan event detector 222 is shown in FIG. 3. In some examples, the example processes, methods, logic, software, computer- or machine-readable instructions of FIG. 3 are carried out during a decode session. The program of FIG. 3 begins at block 302 when an object (such as item 122) enters one or more FOVs of the barcode reader 200, for example, captured in one or more original images through one or more windows 206, 210 (block 302). The block 302 identifies an indicia (such as the barcode 124) associated with an object in one or more of the FOVs. A block 304 scans and decodes the identified barcode at the barcode reader 200. In some examples, the barcode reader 200 then communicates the decoded barcode payload to a POS system server, such as the server 130.

At a block, the barcode reader 200, such as the scan event detector 222, detects the presence of the object at the weighing platter 204. For example, the scan event detector 222 can detect when a scale of the weighing platter 204 changes from a zero value measured weight to a weight greater than a zero value, indicating the presence of an object on the weighing platter 204. In some examples, the scan event detector 222 can detect when the object is at the weighing platter 204 by analyzing image data captured from a FOV of the window 210 (e.g., FOV 216) or of the window 206 (e.g., FOV 218). For example, in some examples, captured image data is used to identify the object, such as an outer edge of the object and determine when at least a portion of the outer edge of the object is adjacent to a top surface of the weighing platter 204. In some such examples, the FOV of the window in the tower portion (e.g., the FOV 216) extends to include all or a portion of the top surface of the weighing platter 204.

To provide a basis from reach a release condition can be initiated, a block 308 detects stabilization of the object at the weighing platter 204. In some examples, the block 308 is implemented by detecting stabilization by detecting a scale signal of the weighing platter 204 and determining that the scale signal does not vary within a stabilization time period placement. The stabilization time period can be stored within the scan event detector 222 and may be measured from the detection of the presence of the object at block 306. In some examples, the stabilization time period is shorter than a timeout period for the release condition. In some examples, the stabilization time period is a sufficient time period to let the scale of the weighing platter 204 settle to a non-varying weight value that may be reported by the barcode reader 200 to a POS system server for determining a price of the object. For example, when the barcode is a barcode such as a GS1 code associated with a weight data element, the barcode reader 200 may report the GS1 code and the measured weight from the weighing platter 204 to the POS system server, which then determines the price of the scanned and weighed object.

In some examples, stabilization is determined from image data. For example, the scan event detector 222 may determine from image data captured by one or both of the imaging assemblies 212 and 214 that the object has not moved over stabilization time period.

In response to detecting stabilization of the object at the weighing platter 204, the barcode reader 200, such as at the scan event detector 222, prevents reporting of subsequent decoding of the barcode on the object, at a block 310. In some examples, even with the barcode associated with the object decoded at block 304, the barcode reader 200 continues to capture images of the of the object through one or more FOVs. Further, the barcode reader 200 may continue to identify, scan, and decode the barcode associated with the object captured in those images, even though the object's barcode as already been scanned and the object is merely resting on the weighing platter 204 being weighed. The block 310 prevents reporting of decoding of the barcode until a release condition is satisfied at a block 312. That is, in the illustrated example, the block 310 and the block 312 form a control loop that is not interrupted until a release condition is satisfied, thereby preventing inadvertent subsequent scanning of the object. In response to the release condition being satisfied, the barcode reader is released to allow for subsequent scanning, decoding, and reporting of a subsequent item.

In some examples, the release condition as a timeout period, To. In some examples, the To is preferably $0<To \leq 1$ s, and more preferably the To=0.5 s. In some examples, the block 312 measures the timeout period from the detection of the stabilization at block 308.

In some examples, the barcode reader 200 detects a destabilization event, after the stabilization, and the release condition is a timeout period measured from the detection of the destabilization of the object. An optional destabilization detection block 316 is shown in FIG. 3, where the block 316 block may detect destabilization by detecting at least partial removal of the object from the weighing platter.

In some examples, the destabilization of the object detected at block 316 is movement of the object detected by an imaging assembly, such as one or both of the imaging assemblies 212 and 214, after capture image data has been used by the block 308 to determine that the object had stabilized, e.g., not moved. For example, in some examples, the scan event detector 222 is configured to determine when the object has moved from its stabilization position, by analyzing changes in the location of an outer edge of the object, as appearing in the capture in data. In some examples, the scan event detector 222 is configured to determine, at the block 316, not only when the object has moved from the stabilization position, but when the object has moved off of the weighing platter 204. For example, image data may be assessed to determine when there is a distance between the outer edge of the object top surface of the weighing platter 204.

In other examples, the destabilization event may be at least partial removal of the object of the weighing platter, determined by any reduction in weigh value from the weight value of the object at stabilization, measured by a scale of the weighing platter, or determined by analyzing image data for any movement of the object from the stabilization position. In some examples, the scan event detector 222 detects when the weighing platter detects a zero weigh value. In some examples, the scan event detector 222 determines movement from image data captured by the imaging assemblies 212 and 214. Thus in some examples, destabilization may be any measured movement of the object, while in other examples destabilization is movement of object that satisfies a condition, such as movement of the object entirely off the weighing platter. In some example, this level sensitivity of destabilization may be determined by a user using an digital display interface that offers the option for type of destabilization event. In some examples, the type of destabilization event may be determined based on the barcode, where the symbology reader is configured to implement a certain type of destabilization event for some barcodes and another type of destabilization event for other barcodes.

While in some examples the release condition is monitored for from the detection of the stabilization of the object (determined at block 308), in some examples, the release condition is monitored from the detection of destabilization of the object (determined at block 316). For example, once the block 316 determines a destabilization event, the block 310 prevents reporting of subsequent decoding of the barcode until the block 312 determines that a timeout period, measured from the destabilization time of block 316 has expired.

In some examples, at the block 312, the barcode reader 200 detects for movement of the object out of a FOV(s) of the imaging assembly (e.g., imaging assemblies 212 and/214) as the release condition. For example, the scan event detector 222 may analyze image data determine from a plurality of captured images, a point in time when the object is no longer visible in one or more of the FOVs (e.g., FOVs 216/218) and determine when the object is no longer visible, that the release condition is satisfied, thereby allowing control to pass to block 314. In such examples, the release condition may be configured as when the object is entirely out of view of the FOV(s), while in other examples, the release condition is configured to be when the object is partially out of view of the FOV(s).

Thus, as provided by the various examples herein, the release condition may be based on scale weight data or captured image data. The release condition may be based on analysis of image data. The release condition may be monitored from the detection of stabilization object or from the detection of destabilization of the object after the object had stabilized. In other examples, the release condition may be monitored from another detection event, such as the detection of the presence of the object at the weighing platter, i.e., at event preceding and thus independent of stabilization of the object. In some examples, the release condition is a condition not associated with a preceding event. For example, in some variations, the release condition is determined to be the movement of the object out of the FOV(s) of the barcode reader 200.

Further still, in some examples, the barcode reader 200 may be configured to terminate the process 300 before a timeout period is achieved. For example, in some examples, the block 312 determines when a timeout period is ended to pass control to the block 314, but additionally, the block 312 applies a timeout period interrupt. If the barcode reader 200, at the block 312, detects that the object is no longer within a FOV(s) within the timeout period, the block 312 may determine end the timeout period detection early, thereby indicating a release condition has been satisfied, and then pass control to the block 314.

FIG. 4 is a block diagram representative of an example logic circuit capable of implementing, for example, the barcode decoder 220, the scan avoidance event detector 222 and/or, more generally, the PCB 211. The logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes an example processor 402 such as, for example, one or more microprocessors, controllers, and/or any suitable type of processor. The processing platform 400 of FIG. 4 includes memory (e.g., volatile memory, non-volatile memory) 404 accessible by the processor 402 (e.g., via a memory controller). The processor 402 interacts with the memory 404 to obtain, for example, machine-readable instructions stored in the memory 404 corresponding to, for example, the operations represented by the flowcharts and/or examples of this disclosure. Additionally or alternatively, machine-readable instructions corresponding to the example operations described herein may be stored on one or more removable media (e.g., a compact disc (CD), a digital versatile disk (DVD), removable flash memory, etc.) that may be coupled to the processing platform 400 to provide access to the machine-readable instructions stored thereon. The machine-readable instructions may be executed by the processor 402 to implement barcode decoder 220 and the scan avoidance event detector 222. The memory 404 may additionally store scan avoidance event alerts at the barcode reader 200, a remote server, etc.

The example processing platform 400 of FIG. 4 also includes a network interface 406 to enable communication with other machines via, for example, one or more networks. The network interface 406 includes any suitable type of communication interface(s) (e.g., wired and/or wireless interfaces) configured to operate in accordance with any suitable protocol(s). The network interface 406 may be used to communicatively couple the barcode reader 200 to a remote device.

The processing platform 400 of FIG. 4 also includes input/output (I/O) interfaces 408 to access image data from imaging devices, cameras, the imaging assemblies 212, 214, etc.

Although FIG. 4 depicts the I/O interfaces 408 as a single block, the I/O interfaces 408 may include a number of different types of I/O circuits or components that enable the processor 402 to communicate with peripheral I/O devices. Example interfaces 408 include an Ethernet interface, a universal serial bus (USB) interface, a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable storage medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A computer-implemented method for preventing inadvertent subsequent scanning using a symbology reader, the method comprising:
    scanning and decoding a barcode on an object using the symbology scanner;
    detecting presence of the object at a weighing platter of the symbology reader and detecting stabilization of the object at the weighing platter; and
    responsive to detecting the stabilization of the object, preventing reporting of subsequent decoding of the barcode until a release condition is satisfied
    wherein the release condition is a timeout period, the method further comprising:
    if the object is no longer detected within a field of view of the symbology reader during the timeout period, ending the timeout period and allowing a reporting of a subsequently decode barcode.

2. The computer-implemented method of claim 1, further comprising:
    monitoring for the release condition starting from the detection of the stabilization of the object.

3. The computer-implemented method of claim 2, wherein the release condition is a timeout period measured from the detection of the stabilization of the object.

4. The computer-implemented method of claim 1, further comprising:
    detecting an destabilization of the object; and
    monitoring for the release condition from the detection of the destabilization of the object.

5. The computer-implemented method of claim 4, wherein the release condition is a timeout period measured from the detection of the destabilization of the object.

6. The computer-implemented method of claim 4, wherein the destabilization is movement of the object determined by an imaging assembly of the symbology reader platter.

7. The computer-implemented method of claim 4, wherein the release condition is movement of the object out of a field of view of an imaging assembly of the symbology reader.

8. The computer-implemented method of claim 1, wherein the stabilization of the object is placement of the object on the weighing platter, the method further comprising: detecting at least a partial removal of the object from the weighing platter, wherein the release condition is a timeout period measured from the removal of the object from the weighing platter.

9. The computer-implemented method of claim 8, wherein detecting at least the partial removal of the object from the weighing platter comprises detecting when the weighing platter detects a zero weight value.

10. The computer-implemented method of claim 8, wherein detecting at least the partial removal of the object from the weighing portion comprises analyzing one or more images of the object captured by an imaging assembly of the symbology reader and determining from the one or more images when the object is off of the weighing platter.

11. The computer-implemented method of claim 8, the method further comprising detecting the stabilization of the object by detecting a scale signal of the weighing platter and determining that the scale signal does not vary within a stabilization time period.

12. The computer-implemented method of claim 1, wherein the barcode is associated with a weight data element.

13. The computer-implemented method of claim 12, wherein the barcode is a GS1 code.

14. A symbology reader to prevent inadvertent subsequent scanning, the symbology reader comprising:
    a housing having a weighing platter;
    an imaging assembly within the housing and configured to capture one or more images over at least one field of view;
    a processor within the housing;
    a tangible machine-readable storage medium within the housing and storing machine-readable instructions that, when executed by the processor, cause the processor to:
    scan and decode a barcode on an object;
    detect a presence of the object on the weighing platter and detect stabilization of the object on the weighing platter;
    responsive to detecting the stabilization of the object, prevent reporting of subsequent decoding of the barcode until a release condition is satisfied;

detect a destabilization of the object; and
monitor for the release condition from the detection of the destabilization of the object,
wherein at least one of (i) the release condition is movement of the object determined by the imaging assembly or (ii) the release condition is movement of the object out of a field of view of the imaging assembly.

15. The symbology reader of claim 14, wherein the tangible machine-readable storage medium stores machine-readable instructions that cause the processor to: monitor for the release condition starting from the detection of the stabilization of the object.

16. The symbology reader of claim 15, wherein the release condition is a timeout period measured from the detection of the stabilization of the object.

17. The symbology reader of claim 14, wherein the release condition is a timeout period measured from the detection of the destabilization of the object.

18. The symbology reader of claim 14, wherein the stabilization of the object is placement of the object on the weighing platter, wherein the tangible machine-readable storage medium stores machine-readable instructions that cause the processor to: detect at least a partial removal of the object from the weighing platter, wherein the release condition is a timeout period measured from the removal of the object from the weighing platter.

19. The symbology reader of claim 18, wherein the tangible machine-readable storage medium stores machine-readable instructions that cause the processor to detect at least the partial removal of the object from the weighing portion by detecting when the weighing platter detects a zero weight value.

20. The symbology reader of claim 18, wherein the tangible machine-readable storage medium stores machine-readable instructions that cause the processor to detect at least the partial removal of the object from the weighing portion by analyzing one or more images of the object captured by the imaging assembly and determining from the one or more images when the object is off of the weighing platter.

21. The symbology reader of claim 14, wherein the tangible machine-readable storage medium stores machine-readable instructions that cause the processor to detect the stabilization of the object by detecting a scale signal of the weighing platter and determining that the scale signal does not vary within a stabilization time period.

22. The symbology reader of claim 14, wherein the release condition is a timeout period, wherein the tangible machine-readable storage medium stores machine-readable instructions that cause the processor to:
if the object is no longer detected within a field of view of the weighing platter during the timeout period, end the timeout period and allow a reporting of a subsequently decode barcode.

23. The symbology reader of claim 14, wherein the symbology reader is a bioptic scanner having a tower portion and a horizontal portion comprising the weighing platter.

24. The symbology reader of claim 23, wherein the imaging assembly comprises an imager in at least one of the tower portion or the horizontal portion.

* * * * *